United States Patent
Johnson et al.

(10) Patent No.: US 7,606,705 B2
(45) Date of Patent: Oct. 20, 2009

(54) SPEECH DATA RECEIVER WITH DETECTION OF CHANNEL-CODING RATE

(75) Inventors: Phillip Marc Johnson, Raleigh, NC (US); Ramanathan Asokan, Cary, NC (US)

(73) Assignee: Sony Ericsson Mobile Communications, Lund (SE)

( * ) Notice: Subject to any disclaimer, the term of this patent is extended or adjusted under 35 U.S.C. 154(b) by 0 days.

(21) Appl. No.: 10/577,394

(22) PCT Filed: Jan. 5, 2004

(86) PCT No.: PCT/IB2004/000048
§ 371 (c)(1), (2), (4) Date: Apr. 27, 2006

(87) PCT Pub. No.: WO2004/066546
PCT Pub. Date: Aug. 5, 2004

(65) Prior Publication Data
US 2006/0281485 A1   Dec. 14, 2006

(30) Foreign Application Priority Data
Jan. 21, 2003 (US) .............................. 10/248,448

(51) Int. Cl.
*G10L 19/02* (2006.01)
(52) U.S. Cl. .................. 704/229; 704/228; 704/501; 375/341
(58) Field of Classification Search ......... 704/500–504, 704/221, 227–228, 200, 229; 455/67.3, 63; 714/774, 780; 370/347; 375/341, 340, 130
See application file for complete search history.

(56) References Cited
U.S. PATENT DOCUMENTS
5,694,414 A * 12/1997 Smith et al. ................. 375/130
(Continued)

FOREIGN PATENT DOCUMENTS
WO   WO 00/35137 A   6/2000

OTHER PUBLICATIONS
Sony Ericsson Mobile Communications AB, "International Search Report", PCT/IB/2004/000048, May 27, 2004.
(Continued)

*Primary Examiner*—Huyen X. Vo
(74) *Attorney, Agent, or Firm*—Frederick D. Bailey; Moore & Van Allen, PLLC

(57) ABSTRACT

Disclosed is a system and method for channel decoding speech frames in a receiver capable of multiple (M) codec modes, wherein channel encoded speech frames include an inband bit portion and a speech portion. An inband bit decoder decodes the inband bit portion (700) of a received frame to obtain confidence levels associated with each of the M codec modes. Using these confidence levels, the codec modes are ordered from most to least likely. The speech frame is then decoded by a channel decoder using the most likely codec mode (704). A frame determination check (720) is performed to determine the quality of the decoded speech frame. If the decoded speech frame is determined to be of poor quality, then the channel decoding process is repeated using the next most likely codec mode (736) corresponding to the next highest inband bit decoding confidence level. This process is repeated until a good speech frame is decoded or some exit criteria is reached.

7 Claims, 10 Drawing Sheets

U.S. PATENT DOCUMENTS

| | | | | |
|---|---|---|---|---|
| 5,982,766 | A | * | 11/1999 | Nystrom et al. ............. 370/347 |
| 6,421,527 | B1 | * | 7/2002 | DeMartin et al. ........ 455/67.13 |
| 6,732,321 | B2 | * | 5/2004 | Classon et al. ............. 714/774 |
| 7,076,005 | B2 | * | 7/2006 | Willenegger ................ 375/341 |
| 2002/0141516 | A1 | | 10/2002 | Willenegger |

OTHER PUBLICATIONS

Sony Ericsson Mobile Communications AB, "Written Opinion", PCT/IB2004/000048, May 27, 2004.

Sony Ericsson Mobile Communications AB, "International Preliminary Report on Patentability", PCT/IB2004/000048, May 27, 2004.

* cited by examiner

SPEECH DATA RECEIVER WITH DETECTION OF CHANNEL-CODING RATE

BACKGROUND ART

The following acronyms may be used throughout this description. They are listed in TABLE 1 below for ease of reference.

TABLE 1

| ACRONYM | Definition |
| --- | --- |
| ACS | Active Codec Set |
| AFS | AMR Full rate Speech service |
| AHS | AMR Half rate Speech service |
| AMR | Adaptive Multi Rate speech service |
| ASIC | Application Specific Integrated Circuit |
| BER | Bit Error Rate |
| BSS | Base Station Subsystem |
| BTS | Base Transceiver Station |
| CDMA | Code Division Multiple Access |
| CHD | Channel Decoder |
| CHE | Channel Encoder |
| C/I | Carrier-to-Interference ratio (used to measure link quality) |
| CMI | Codec Mode Indication (speech rate used on attached link) |
| CMC | Codec Mode Command (speech rate commanded to be used by an MS on its uplink) |
| CMR | Codec Mode Request (speech rate requested by an MS to be used on its receiving link) |
| CRC | Cyclic Redundancy Check |
| dB | decibels |
| DL | Downlink |
| DSP | Digital Signal Processor |
| DTX | Discontinuous Transmission |
| EFR | Enhanced Full Rate speech codec for GSM |
| EVRC | Enhanced Variable-Rate Codec, used in IS-95 CDMA |
| FEC | Forward Error Correction |
| FACCH | Fast Associated Control Channel |
| FER | Frame Erasure Rate |
| FPGA | Field Programmable Gate Array |
| FR | Full Rate speech codec for GSM |
| GSM | Global System for Mobile communications, common digital cellular standard |
| HR | Half Rate speech codec for GSM |
| KBPS | Kilo Bits Per Second |
| MS | Mobile Station, e.g. a cellular phone |
| RATSCCH | Robust AMR Traffic Synchronized Control Channel |
| RBER | Residual Bit Error Rate |
| RF | Radio Frequency |
| RXQUAL | Received Signal Quality |
| SID | Silence Descriptor |
| SID_UPDATE | AMR Frame Used to Convey Comfort Noise Characteristics During DTX |
| SNR | Signal to Noise Ratio |
| SPD | Speech Decoder |
| SPE | Speech Encoder |
| TDMA | Time Division Multiple Access |
| TRAU | Transcoding and Rate Adapting Unit |
| UL | Uplink |

Currently, the primary usage of digital cellular systems is for the transmission of voice. The limited available spectrum (bandwidth) of such systems requires that speech be encoded using a minimal number of bits in order to reduce the redundancy of the source data. Potentially poor channel conditions typical in cellular systems, e.g. low SNR and fading, necessitate the use of a channel coding scheme to add redundancy back in an efficient manner. Typically, the channel coding consists of a forward error correction scheme (block or convolutional code) and an error detection scheme, e.g. CRC.

Within the context of the GSM digital cellular standard, several speech codecs are standardized and in use. The original GSM speech codec is commonly referred to as the Full-Rate (FR) speech codec and encodes speech at a rate of 13 kbps. The next generation of codecs took divergent paths. The Half-Rate (HR) codec allowed for a doubling of system capacity but at the expense of voice quality. The Enhanced Full-Rate (EFR) kept the speech rate approximately the same (12.2 kbps), but improved algorithms and increased DSP processing power provided significantly higher voice quality. This codec has been well received and is currently used in most GSM systems. All of these voice services use convolutional codes for error correction and some form of CRC for error detection.

In 1997, the process of standardizing a new GSM speech service was begun in order to take advantage of speech coding advances. A set of requirements was established that included both quality and capacity increases over previous GSM codecs. The improved quality requirements primarily related to operation during poor channel conditions. A new voice service was defined that contained multiple speech coding rates and could adapt the level of channel coding to the channel conditions. This new service became known as the Adaptive Multi-Rate (AMR) speech service for GSM.

To meet both the capacity and quality goals of the AMR service, it was defined with half and full-rate modes of operation. In the full-rate mode, there are 8 speech codec rates defined. Each includes an associated channel coding scheme. For the half-rate mode, there are 6 speech codec rates defined, each having a unique channel coding scheme. Hence, there are a total of 14 channel codes defined for AMR voice and 8 speech rates. The 6 AHS speech rates are a subset of the 8 AFS rates.

Not all of the codec modes may be used within a given call. Specifically, at call setup AMR configurations are downloaded to the MS and BTS. The AMR configuration includes an Active Codec Set (ACS) together with thresholds and hysteresis values. The ACS may contain anywhere from 1 to 4 codecs. The thresholds and hysteresis values are used by an AMR receiver to determine the optimal receive link codec mode from those within the ACS.

The advantage of AMR stems from its ability to dynamically adapt channel coding to meet the current needs of the link wherein the link may include degradations due to low signal fading, shadowing, noise, etc. This link adaptation is assisted by measurements within the AMR receiver of both the BTS and MS. The general operation of AMR link adaptation is shown in the block diagram of FIG. 1.

With respect to the MS, its receiver is required to constantly monitor channel quality in order to determine an appropriate downlink codec mode. The channel quality is quantified as a logarithmic (dB) C/I ratio. It is typically measured on a TDMA burst basis or a speech frame basis and then filtered to remove fast-varying random components. The filtered channel quality is compared against the BSS commanded threshold and hysterises to determine the optimal codec mode. The resultant mode is encoded as a Codec Mode Request (CMR) and returned to the BSS in the reverse link Normally, the BSS will grant the request and use the requested mode for encoding the downlink channel to the MS.

A similar procedure is followed within the BTS. Specifically, the BTS receiver monitors the uplink channel quality from the MS and determines an optimal codec mode based on threshold/hysterisis values together with potential constraints from the network control. The resultant mode is transmitted in the downlink to the MS. This mode is termed the Codec Mode Command (CMC) and is similar to the CMR with the notable exception that the CMC commands the MS as to which rate to use on the uplink whereas the CMR requests that the BTS use a rate on the downlink.

Rate adaptation must occur in a relatively fast fashion in order to be effective and, hence, is signaled using inband data encoded within each AMR traffic frame. Every frame includes inband data but it alternates in meaning between describing its host link and commanding/requesting a mode for the opposite link. When representing its host link, this data is termed the Codec Mode Indication (CMI) and it indicates how that link was encoded. A given CMI value is associated both with the frame in which it was encoded and the succeeding frame. When representing the opposite link, this data provides the CMC (transmitted in the forward link) or the CMR (transmitted in the reverse link). Regardless of its meaning, the inband data always represents two source bits (0 to 3) and can be thought of as an index into the ACS.

With respect to channel coding, the allocation of bits between speech, inband data, FEC, and CRC error protection bits is summarized in the diagram of FIG. 2 for both AFS and AHS frames. For each AFS frame, 8 bits are allocated for encoding the 2-bit inband data. This coding is effectively a ¼ rate block code. For AHS frames, 4 bits are allocated for the encoded inband data effecting a Liz rate block code. The speech bits are subjectively ordered and broken into three classes according to their importance. Class 1a (most important) bits have a 6 bit CRC calculated and appended to them The class 1a bits, class 1a CRC bits, and class 1b bits are encoded using a systematic, punctured, recursive convolutional code. Any remaining speech bits are classified as class 2 and receive no channel coding. There are no class 2 bits for AFS frames as all speech bits are protected. The channel coded AMR frames are block diagonally interleaved and mapped onto bursts in the same manner as existing (HR, FR, EFR) GSM speech frames.

Given the aforementioned coding schemes, it remains to be determined how a receiver turns RF information into bits appropriate for the speech decoder and, ultimately, pleasing audio for the listener, e.g. MS user.

The GSM standard allows considerable flexibility regarding receiver design. The transmit side, particularly channel encoding scheme and related, is precisely specified while the receive side is restricted only by performance limits regarding sensitivity and the like. MS and BTS manufacturers are thus allowed alternative designs according to their appropriateness within a given architecture. For example, poor RF receiver performance may be compensated by a good baseband receiver (channel decoding) and vice versa. It is to be understood that the receiver described herein is typical and that the novel aspects of the invention are applicable to alternate receiver designs.

FIG. 3 provides a block diagram of a typical AMR baseband receiver. RF samples, e.g. I/Q, are collected for bursts of data and passed to an equalizer/demodulation block 302. The equalizer block typically outputs soft bits corresponding to the demodulated data. These bursts are accumulated into blocks of data corresponding to speech frames where 4 bursts comprise an AFS block and 2 bursts comprise an AHS frame. The data blocks are de-interleaved 304 and passed to the AMR channel decoder 306 for processing as well as a frame classification block 308. Provided the data block represented speech (or comfort noise during DTX periods), the resultant speech frame output is input to the speech decoder which converts the data into PCM samples appropriate for converting into audio.

Some other data paths are also possible out of the channel decoder. Specifically, the frame classification procedure analyzes each frame out of the deinterleaver to determine its type, e.g. speech 310, FACCH 312, RATSCCH 314, SID_UPDATE, etc. The resultant classification determines how the channel decoder should be run, i.e. which channel coding scheme should be decoded.

The block diagram of FIG. 4 describes the dataflow of the AMR channel decoder for speech frames in more detail. Received blocks of data first have the encoded inband bit field extracted. This data is block decoded 402 to determine the 2-bit source data. The decoding is accomplished by finding the codeword that is closest to the received sequence, i.e., the code word that is closest in a squared distance sense to the received sequence. This is typically done using soft received bits. The 2-bit source data indicated by the codeword is output 404 from the inband decoder.

For frames corresponding to the CMR/CMC phase, the inband bits are passed out of the channel decoder 406 for use on the opposite link. For the remaining CMI-phase frames, the inband bits are used to determine how the associated current (and next) frame should be channel decoded 408.

The source inband data is a 2-bit index into the ACS with a maximum value of ACS_size−1. The 2-bit index corresponding to the CMI is mapped to an absolute AMR mode from the entire codec set, i.e. a 3-bit value from 0 to 7 for AFS and 0 to 5 for AHS. This absolute form of CMI is used to determine which channel decoding to perform.

The next steps involve channel decoding the frame according to the absolute CMI inband data of the current or previous frame. First, the encoded data, stripped of the inband data portion, is convolutionally decoded 410 to remove channel-induced bit errors. This is typically done using a recursive Viterbi (maximum likelihood) decoder operating on soft-bit data. The resultant (hard-bit) output data includes a 6 bit CRC field. The next step involves checking the CRC against the original source data 412 to ensure the CRC is correct and removing the CRC bits from the bitstream.

The outputs of the channel decoder are a speech frame, a bad frame indication 414 derived from the CRC status (and possibly other inputs), and the codec mode that also indicates the speech rate to decode. The standard also allows for the classification of a frame as a "degraded frame" if the CRC passes but other parameters indicate that the frame is unreliable.

This method is also described by the flow chart of FIG. 5 that applies only to CMI-phase frames. Received blocks of data first have the encoded inband bit field extracted and block decoded 502 to determine the 2-bit source data. The source inband data is a 2-bit index into the ACS with a maximum value of ACS_size−1. The 2-bit index corresponding to the CMI is mapped 504 to an absolute AMR mode from the entire codec set, i.e. a 3-bit value from 0 to 7 for AFS and 0 to 5 for AHS. Next, the encoded data, stripped of the inband data portion, is convolutionally decoded 506 to remove channel-induced bit errors. The next step involves checking the CRC against the original source data 508 to ensure the CRC is correct and removing the CRC bits from the bitstream. This is followed by a bad frame metric calculation 510. Next, a check is made to determine if the frame is good 512. If it is, the speech frame is passed to the speech decoder 514. Otherwise, the speech frame undergoes a second check to determine how bad the speech frame is 516. If it is a degraded frame it is marked as such and the decoded bits are passed to the speech decoder 518. If it is more than degraded, then the speech frame is masked with respect to the speech decoder 520.

An important factor in user-perceived audio quality during marginal channel conditions is receiver (RF and baseband) sensitivity. This is quantified using a variety of measures. The measures of interest in this context are the Frame Erasure Rate (FER) and the Residual Bit Error Rate (RBER).

The FER refers to the rate at which frames are "erased" due to CRC failures or excessive bit errors. Such frames are not recoverable and typically require bad frame masking within the speech decoder, e.g. repetition of a previous frame or muting/comfort noise generation. RBER refers to the bit error rate which is present in the received bitstream when those frames which are erased are excluded from the statistics.

A good-performing inband decoder is necessary to achieve both low FER and RBER. For purposes of explanation, consider a marginal channel in which the inband data is decoded incorrectly. For any such frame, the wrong channel decoder will be run leading to a frame erasure or (on rare occasions) very high RBER.

Inband bit decoding problems are more pronounced due to the fact that the channel codes are relatively strong. For example, in AFS service the lowest speech codec mode (4.75 kbps) is coded using a $\frac{1}{5}$ rate recursive systematic convolutional code which is punctured to an effective rate of $^{101}/_{442}$. The corresponding inband data is coded using a simple $\frac{1}{4}$ rate block code. Likewise, the lowest AHS speech service is coded using a recursive systematic punctured rate $\frac{1}{3}$ convolutional code whereas the inband data is coded using a simple rate $\frac{1}{2}$ block code. For these and other low rates, the channel codes for the payload data have more error-correcting capability than those of the inband data bits. In other words, in marginal channel conditions the channel decoder (Viterbi and CRC check) may be capable of salvaging many of the frames (correcting the errors/minimizing the BER & FER) provided the inband decoding commands that the correct channel decoder run. However, the inband decoder will tend to fail often and the normal channel decoder will not get the chance to salvage bad frames.

There are a couple of issues that further compound the aforementioned inband decode problem. First, the relatively weak inband coding and strong channel coding occur at the lower operational modes, e.g. 4.75 kbps speech. It is at these rates that the problems are most likely to occur. Such lower rates are used when the channel is quite poor and the combination inband/channel decode needs to perform its best Second, due to the fact that a given frame's CMI controls the current and next frame, a bad decode will erase 2 frames rather than just one.

Performance degradation due to bad inband decodes can be reduced by using a priori knowledge when performing the decode, e.g. using Markov modeling with statistical information. In qualitative terms, the CMI inband data does not often change. It is derived from a channel quality measure which is typically heavily filtered and associated with threshold values. Provided adequate hysterisis values are used, the filtering effectively prevents many mode changes from occurring, e.g. mode changes would typically occur with a mean-time between changes on the order of seconds. Hence, for a given CMI-phase frame, the inband data is most likely to stay the same as that previously decoded. By biasing the inband decoder to stay in the same state, its performance can be significantly increased.

DISCLOSURE OF THE INVENTION

The present invention comprises a system and method for channel decoding speech frames in a receiver capable of multiple (M) codec modes, wherein channel encoded speech frames are comprised of at least an inband bit portion and a speech portion. An inband bit decoder decodes the inband bit portion of a received frame to obtain confidence levels associated with each of the M codec modes. Using these confidence levels, the codec modes are ordered from most to least likely. The speech frame is then decoded by a channel decoder using the most likely codec mode. A frame determination check is performed to determine the quality of the decoded speech frame. If the decoded speech frame is determined to be of poor quality, then the channel decoding process is repeated using the next most likely codec mode corresponding to the next highest inband bit decoding confidence level.

In an alternative embodiment, the channel decoding process is repeated for a maximum number of iterations wherein the upper limit of this maximum is equal to the number of codec modes (M). Moreover, the maximum number of iterations can be limited by the number of confidence levels that exceed a threshold value.

In yet another embodiment, there is disclosed a system and method of channel decoding speech frames in a receiver capable of multiple (M) speech codec modes wherein the channel encoded speech frames are comprised of an inband bit portion and a speech portion. An inband decoder calculates an inband decode metric for each codec mode. A channel decoder then partially decodes speech data for each of the M codec modes. The most likely codec mode is then determined based upon the partially decoded speech data and the calculated inband decode metric data. At this point, the decoding of the speech data is resumed using the most likely speech codec mode just determined.

BEST MODE FOR CARRYING OUT THE INVENTION

For simplicity and clarity, the description herein is written in the context of a GSM AMR system. However, the methods disclosed are also applicable to other multi-rate audio services, e.g. wideband AMR or the EVRC of narrowband CDMA (IS-95).

The present invention improves the performance of an AMR channel decoder primarily by means of increasing the probability of finding the correct inband data for the CMI-phase frames. The increased performance pertains to call configurations in which the AMR ACS contains multiple codecs.

The methods of the present invention may be concretely implemented in software (DSP or general-purpose microprocessor), digital hardware (e.g. ASIC or FPGA) or a combination thereof. The primary requirement for any such application is that multiple channel coding methods be defined and that there exist some method of distinguishing good and bad frame decodings.

Markov-model based inband decoding significantly improves performance at a cost of increased computational complexity. Such added complexity may not be feasible in some architectures so an entirely other method may be needed. Other architectures may not be capable of implementing an ideal Markov-based decoder and instead use a reduced complexity version that performs between that of a simple no-memory decoder and an ideal Markov-based decoder.

The method of the present invention could be used in place of a Markov-based inband decoder (i.e. with a simple no-memory decoder), in conjunction with a Markov-based inband decoder, or in conjunction with some other variant decoder. In fact, the specifics of the inband decoder are somewhat immaterial to the present invention. Most any inband decoder could be used and the present invention would improve their performance to varying degrees. The novel aspect of the invention is in higher-level control of the inband decoder and its combination with other receiver blocks.

Figure 1:
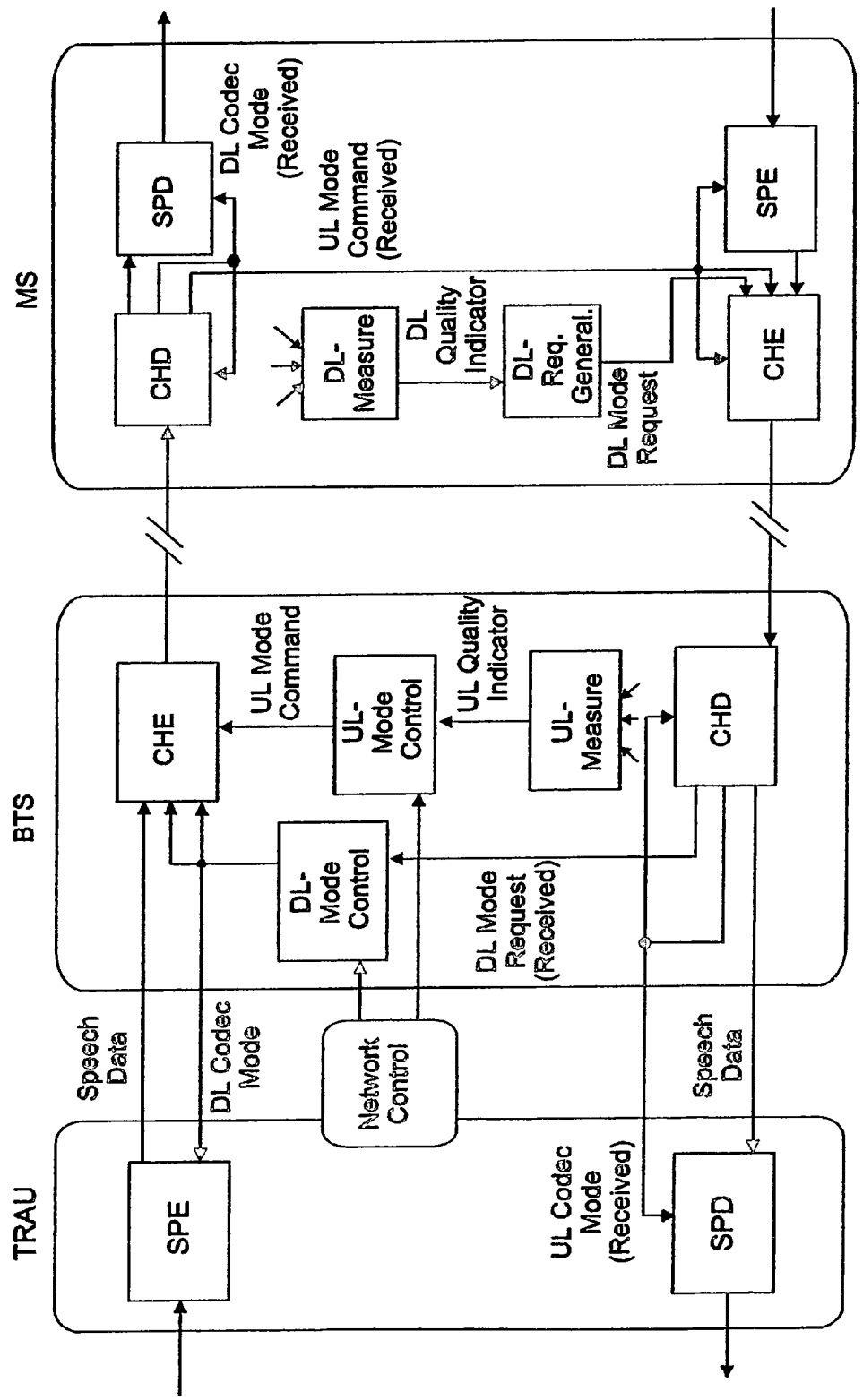
FIG. 1 is a block diagram illustrating the high level operation of an AMR system.
Figure 2:
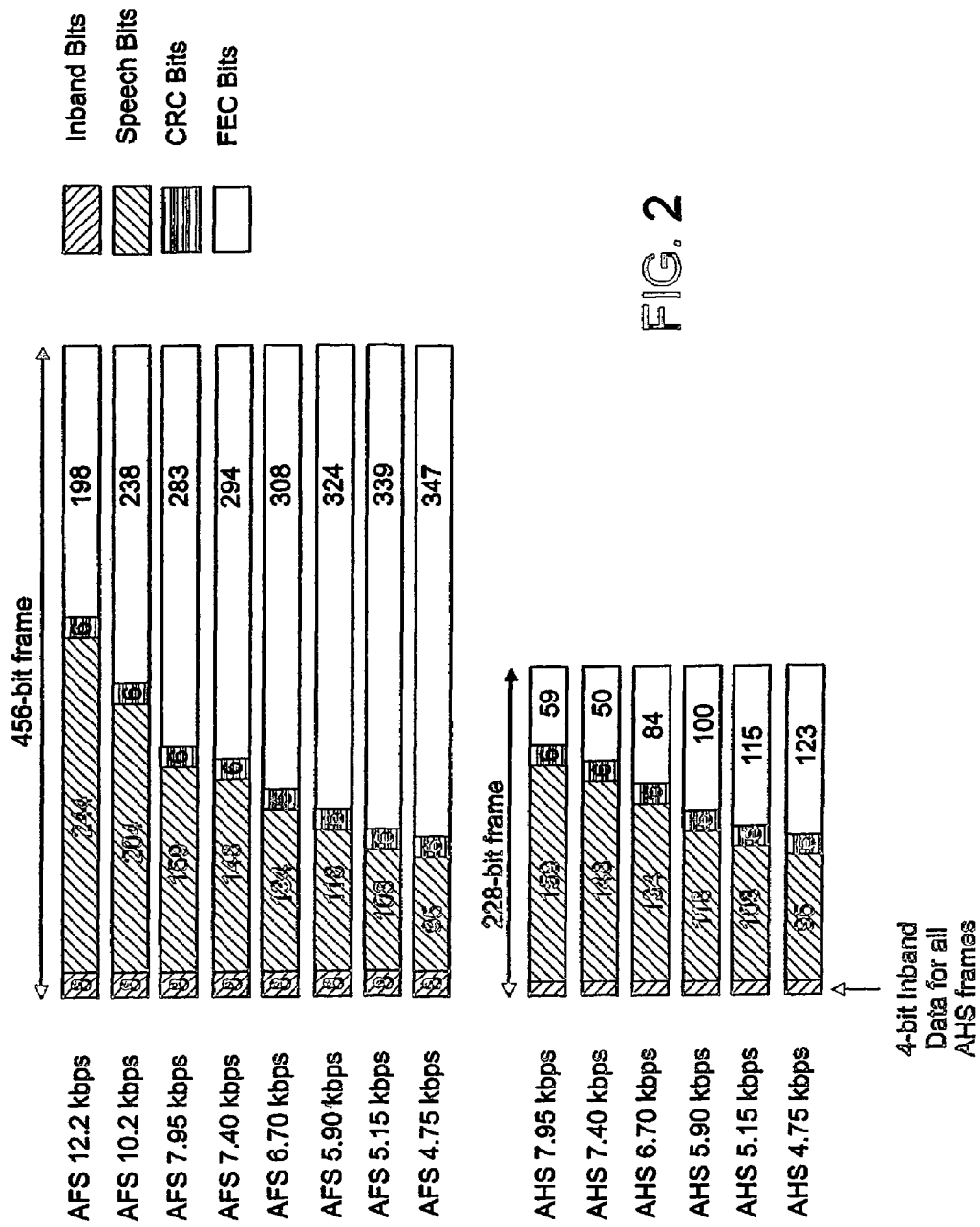
FIG. 2 illustrates AMR bit allocations.
Figure 3:
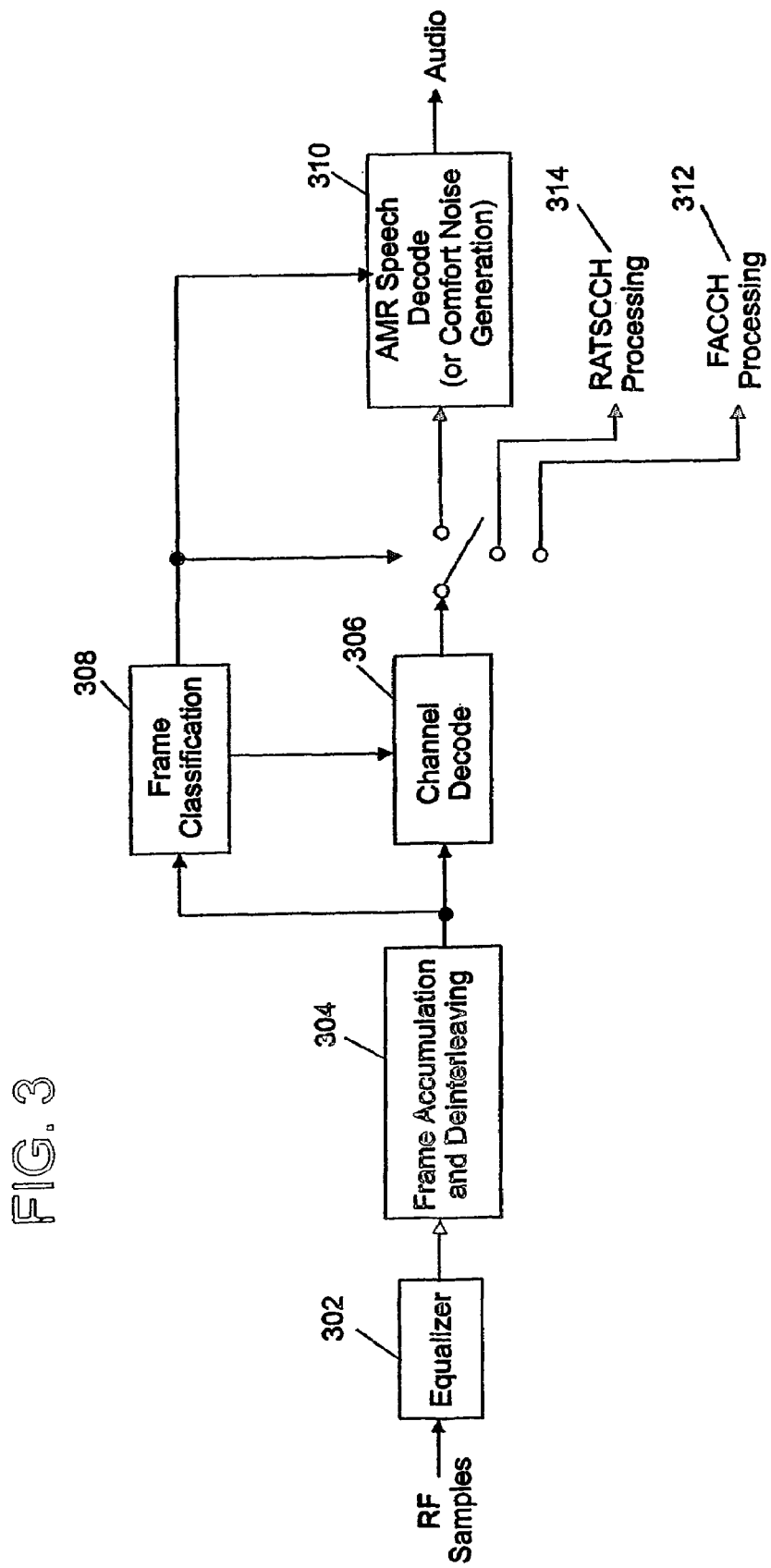
FIG. 3 is a block diagram illustrating a baseband AMR receiver.
Figure 4:
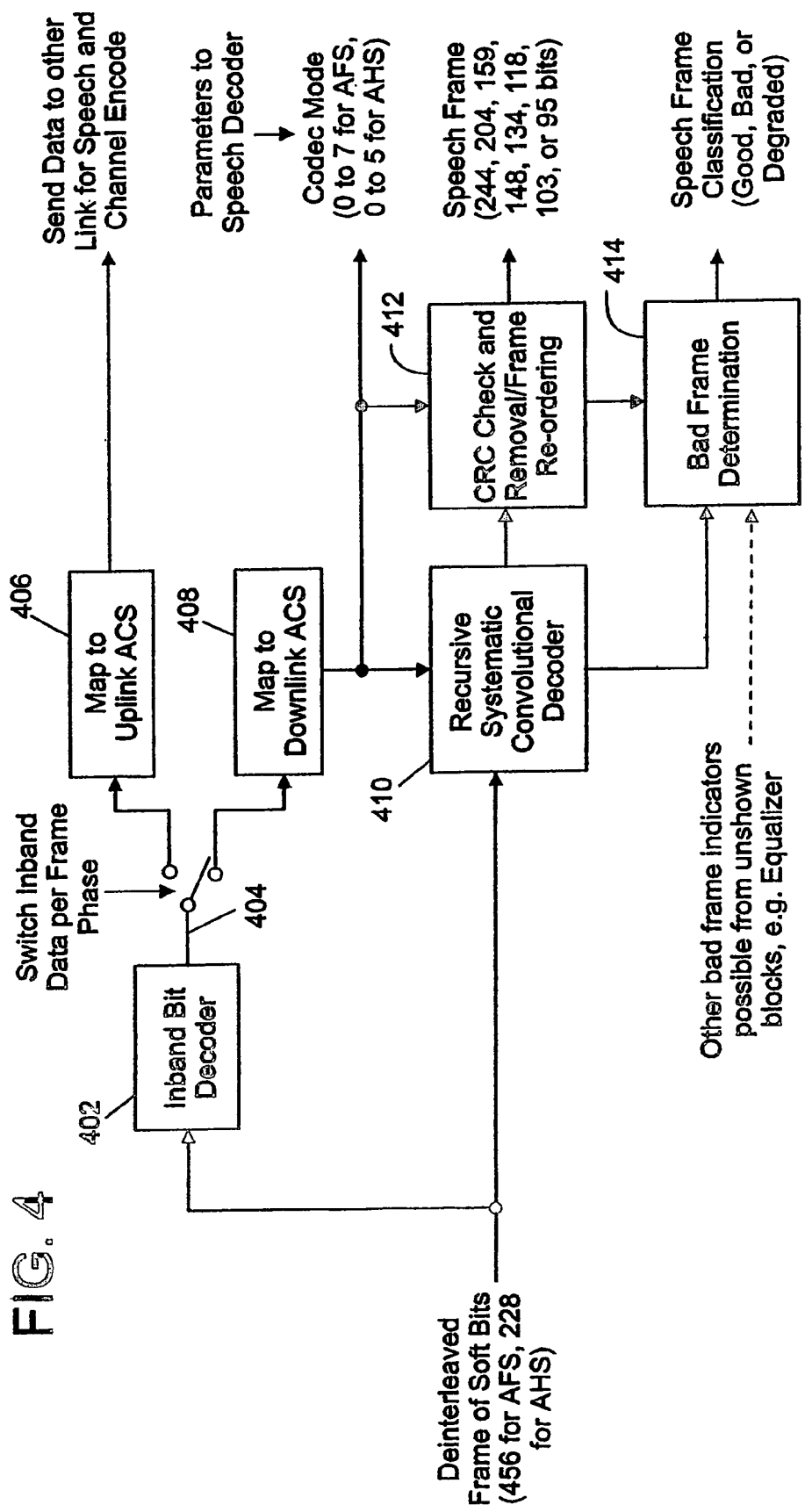
FIG. 4 is a prior art block diagram illustrating an AMR speech frame channel decoder.
Figure 5:
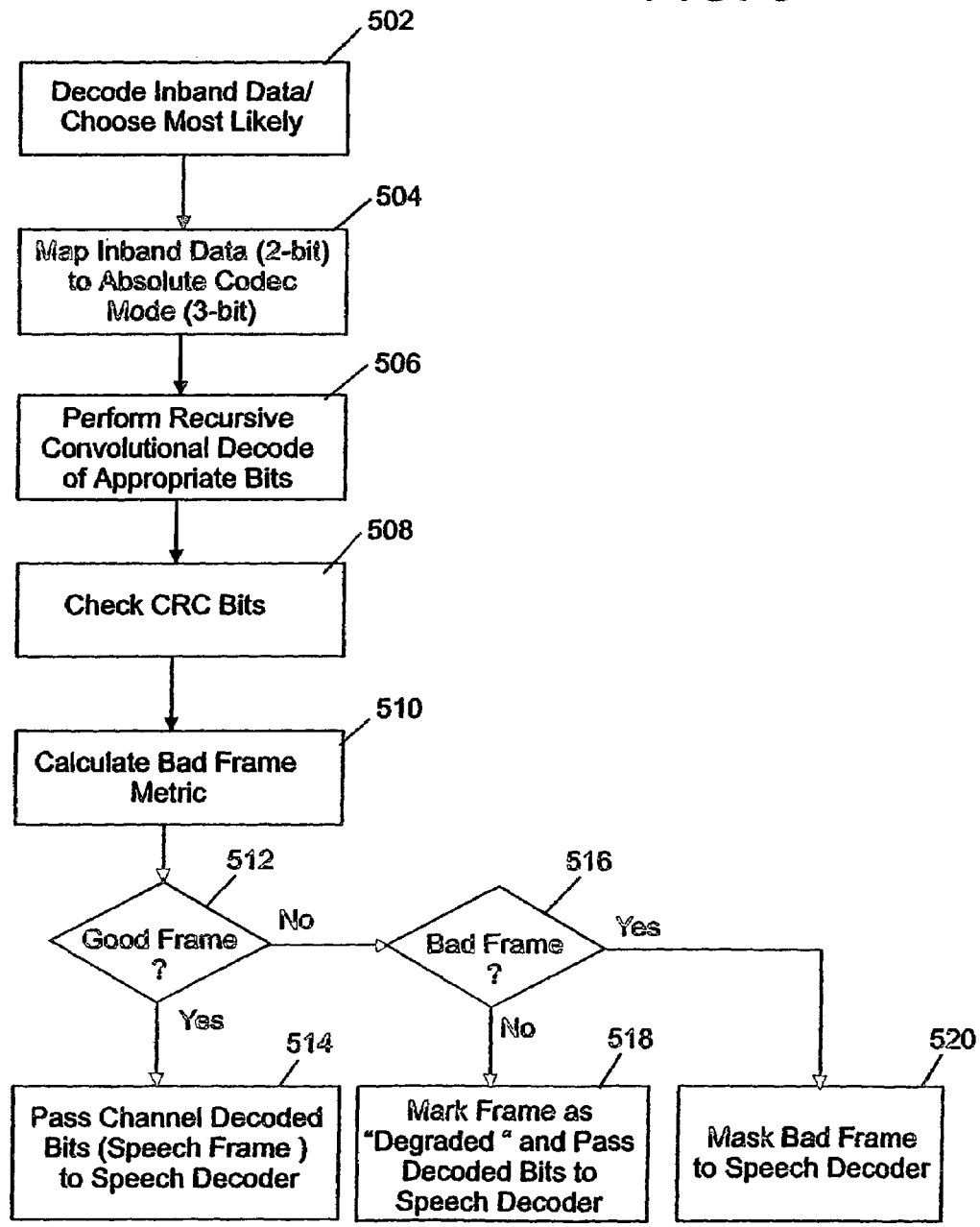
FIG. 5 is a prior art flow chart illustrating a process for channel decoding an AMR speech frame.

In the receive method of FIG. 4, the inband decoder, convolutional decoder, and CRC check are run sequentially. If the CRC check fails or the frame is classified as "bad" via other means, the speech decoder is informed that the frame is bad and masks it in some way. The receiver effectively gives up on the frame and the FER is adversely affected as is the speech quality.

However, if the frame failed due to bad inband decoding, the frame may still be salvageable. What is needed are additional attempts at channel decoding using the other active channel codes.

Figure 6:
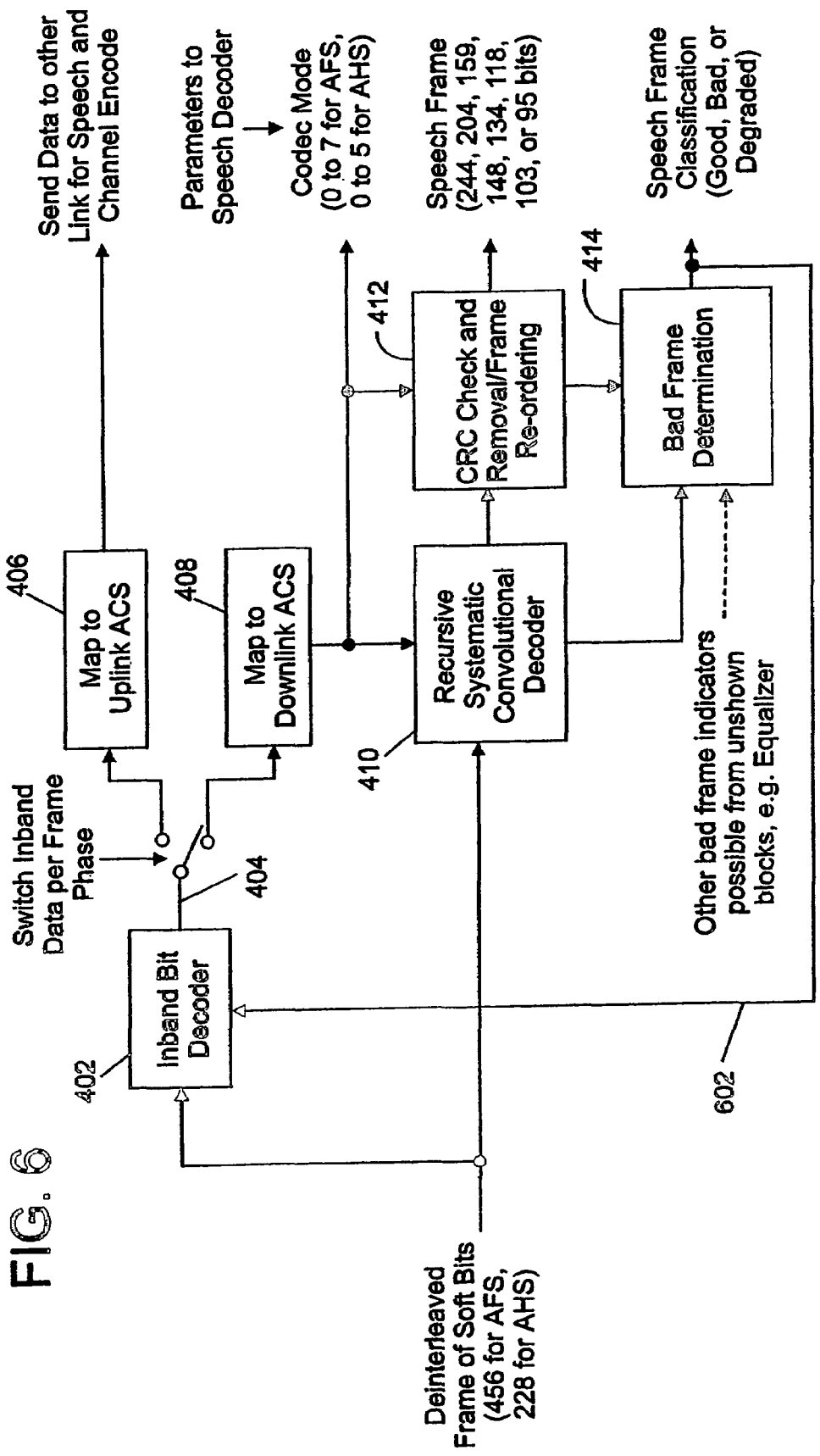
FIG. 6 is a block diagram illustrating an AMR speech frame channel decoder according to the present invention.

The method of the present invention is described in the block diagram of FIG. 6. The difference between this diagram and that of the prior art (FIG. 4) is that FIG. 6 includes a feedback path 602 from the bad frame determination block to the initial blocks of the channel decoding. Thus, a bad (or potentially bad) frame forces the channel decoder to run again utilizing a different channel decoding scheme.

Figure 7:
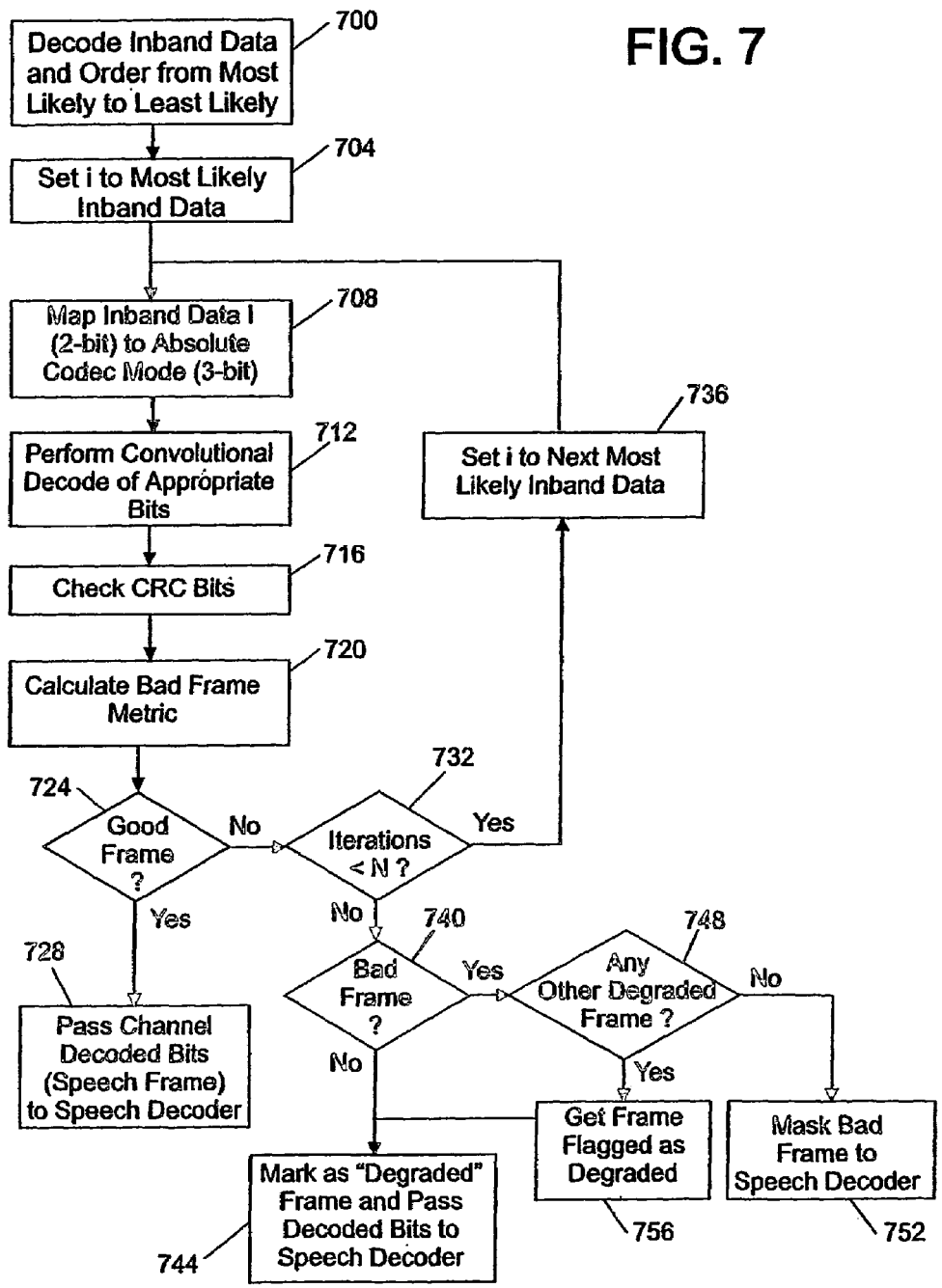
FIG. 7 is a flow chart illustrating a process for channel decoding an AMR speech frame according to the present invention

The method of the present invention is more explicitly explained in the flow chart of FIG. 7. First, the inband data is decoded 700 and the indices are ordered from most likely to least likely, e.g. based upon a Euclidean distance measure. For example, the inband decoder might have 60% confidence that a 3 was transmitted, 25% confidence that a 1 was transmitted, 10% confidence that a 2 was transmitted and 5% confidence that a 0 was transmitted leading to an order of {3,1,2,0}.

The most likely inband decoding (3 in the example) is chosen 704 and mapped 708 to its 3-bit absolute codec mode using the active codec set. For an example ACS of {4.75 kbps (absolute codec 0), 5.90 kbps (absolute codec 2), 7.95 kbps (absolute codec 4), 10.2 kbps (absolute codec 6)}, the mapping would be to the 10.2 kbps mode.

Using the chosen mode and its associated channel coding, a recursive convolutional decode is performed 712 on the class 1 portion of the non-inband received bits (typically soft). The resultant output data contains both a speech frame (204 bits for the example above) together with a 6-bit CRC. The CRC field is extracted and checked 716 against the correct value for the class 1a bits which have been output by the convolutional decoder.

Next, a bad frame classification procedure 720 is performed. For the simplest case, this would consist of only a CRC check, i.e. if the CRC check fails, the frame is classified as bad whereas if it passes the frame is classified as good. Due to the weakness in the CRC and the necessity to classify frames as "degraded," such a simple check is generally not adequate so another check is needed even when the CRC passes.

One such method is to re-encode the channel decoded data and compare it against the originally received data to estimate a channel BER. This method is commonly used in GSM (with the fixed-rate speech services) as the mechanism is usually already in place in order to calculate RXQUAL. If the resultant BER estimate is high, the frame is classified as "bad," if it is low the frame is classified as "good," and if it is moderate the frame is classified as "degraded." The precise method for bad frame determination is considered outside of the scope of this invention and it should be recognized that most current (or future) methods for such classification could be used within this invention.

If the result of the bad frame determination block is that the frame is good 724, those bits corresponding to the speech frame (204 for the 10.2 kbps mode) are passed to the speech decoder 728 along with a flag that the associated frame is good. The channel decode procedure is then complete for that frame.

If, however, the frame is not classified as good a different procedural path is taken. First, it is checked that the number of iterations 732 through the loop has not reached the iteration threshold N. For optimal performance, this threshold is set to the size of the ACS, e.g. 4 in the example previously described. In practice, the performance gain for each additional iteration decreases significantly. Each iteration involves a convolutional decoding which is not computationally trivial meaning many implementations (particularly software-based) will not be capable of such an exhaustive search. For such implementations, N is set lower than the ACS size to a value such as 2.

If another iteration is to be taken, the next most likely inband decoding is chosen 736 to be mapped to an absolute (3-bit) codec mode. The procedure then continues as described previously starting with the inband data mapping. For the example described above, the inband decoding chosen would be 1 which would then be mapped to absolute codec 2 (5.90 kbps mode).

If the maximum number of iterations has already been reached, then the channel decode loop exits. A check is made to see if the last channel decoded frame is bad 740 or not This generally involves checking a metric calculated as part of the bad frame determination block previously. If the frame is bad and there were no previously channel decoded frames flagged as degraded 748, the speech decoder is informed that it needs to mask the frame 752. If the frame is not bad (and not good per the previous check), it is flagged as degraded 744 and sent to the speech decoder.

It may happen that in attempting to find a "good" frame in the multipass channel decoding a "degraded" one was overlooked. Hence, it is necessary to maintain the grading of each channel decoding attempt. If the maximum iteration count is reached with no "good" frame found, a search is made to see if any of the decodings yielded a degraded frame. If so, that frame is flagged appropriately 756 and passed on to the speech decoder.

If only the most likely inband decoding has a significant metric, it is useful to exit the loop early. Consider an example with 3 active codecs and with inband decoding likelihoods {96%, 2%, 2%}. If the bad frame determination classifies the frame as not good on the first iteration, it is quite unlikely that another pass through the loop will find a good frame. In this case, the inband data is probably good but the rest of the payload has significant errors causing a bad CRC or other bad frame indication.

Figure 8:
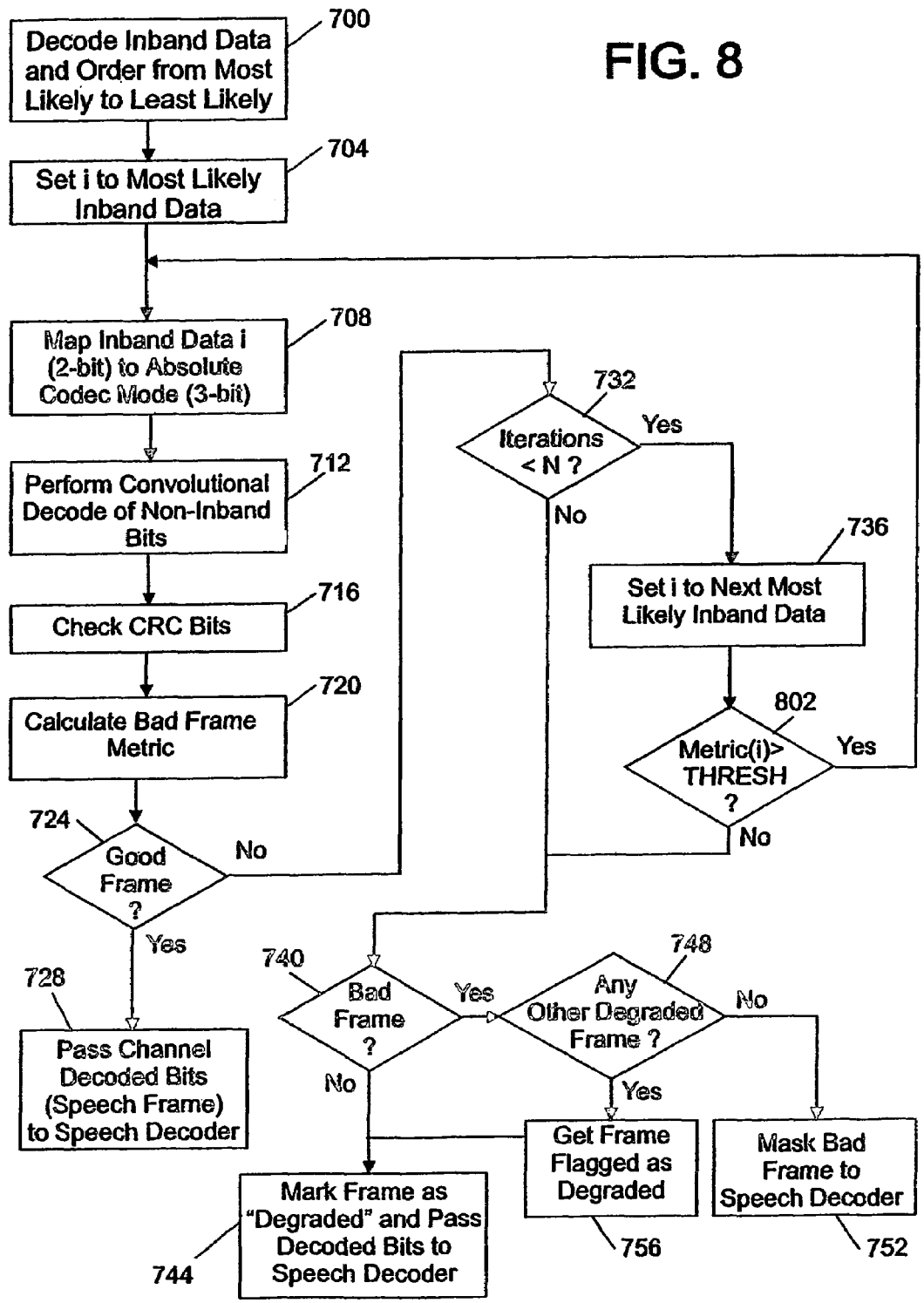
FIG. 8 is a flow chart illustrating an alternative process for channel decoding an AMR speech frame according to the present invention.

This submethod serves to reduce the computational complexity of the preferred method but does not significantly affect performance. The flow chart of FIG. 8 provides an example. It is implemented by adding a threshold metric check 802 somewhere between the "Good Frame" check and the entry back into the channel decode loop at the "Map Inband Data" block. The new switch 802 checks if the inband data to drive the next channel decode was decoded with a reasonable confidence, i.e. above some threshold. If not, the loop exits and execution enters the "Bad Frame" check 740 after the iteration check. Note that the specific ordering of blocks after the "Good Frame" check in the flow chart may be changed to achieve equivalent results. For example, the iteration check could be moved after the metric check.

Figure 9:
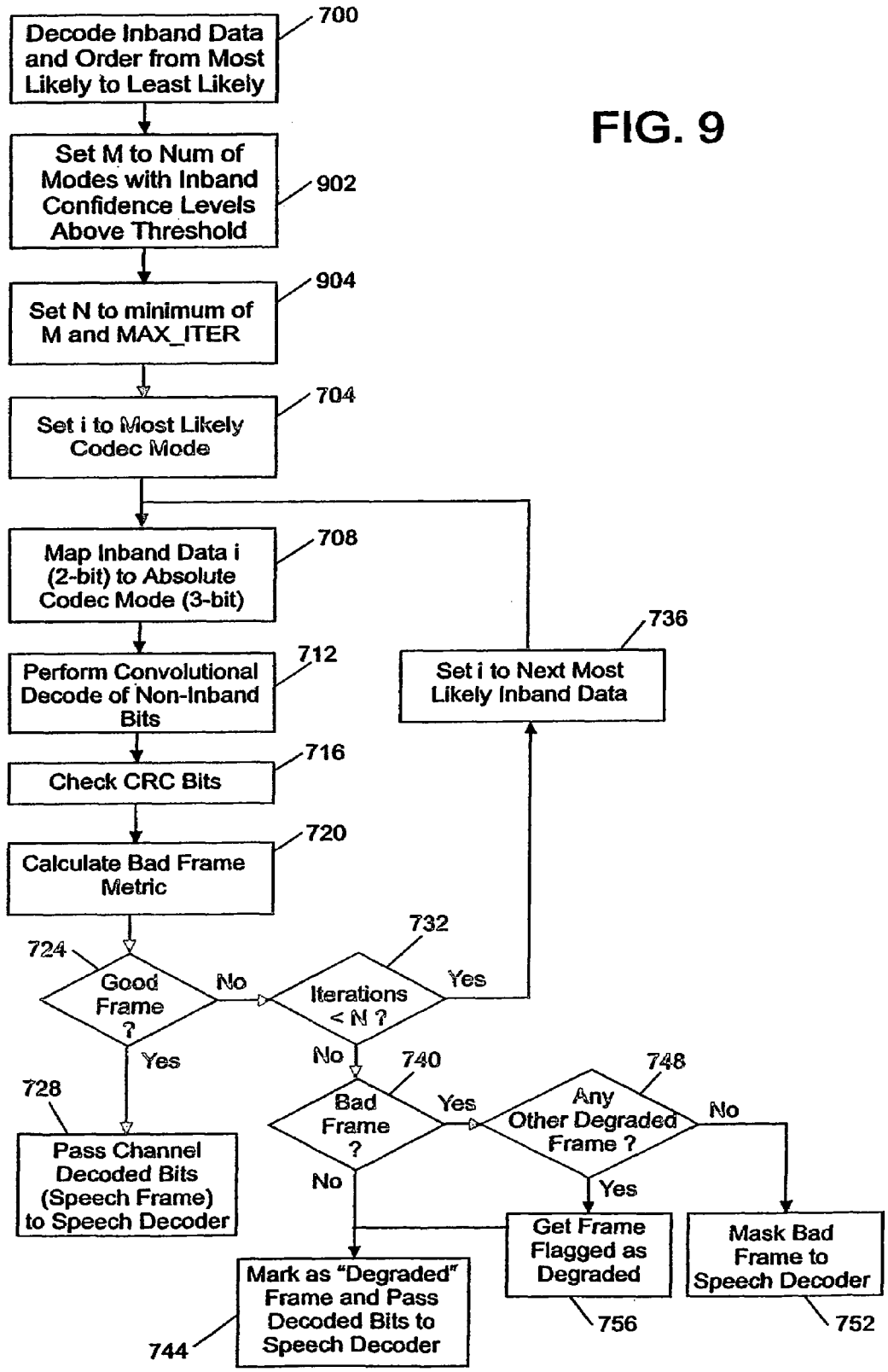
FIG. 9 is a flow chart illustrating yet another alternative process for channel decoding an AMR speech frame according to the present invention.

It should be recognized by one skilled in the art that an equivalent method may also be implemented early in the process flow by checking the inband decode confidence levels after their ordering and setting the iteration threshold accordingly. Such a process is shown in the flow chart of FIG. 9. For example, the algorithm may determine that only inband data having a confidence level greater than 20% should be considered and the iteration threshold N is set to ensure this 902. For the previous example with confidences {60%, 25%, 10%, 5%}, this means N would be set to 2 and only modes corresponding to inband data values of 3 and 1 will be considered for channel decoding. This process also shows that it may be necessary to limit the iterations 904 determined by the procedure. Though this method is generally equivalent performance-wise to the previous one, it has certain implementation advantages that may make it preferable in some architectures.

Henceforth, an alternate embodiment is presented that provides similar performance to the embodiment described with respect to FIG. 7. The alternate embodiment moves the check for unreliable frames to early in the process so that multiple complete channel decodes may be avoided. This method is not as elegant as that of the preferred embodiment but this alternative may be more appropriate for implementations requiring lower worst-case computation.

As stated in the background, the channel decoder is typically implemented using a Maximum Likelihood Sequence Estimation (MLSE) technique commonly referred to as a Viterbi decoder. The reader is presumed to be at least moderately familiar with Viterbi decoding techniques including their usage with recursive channel codes. Though this description is written in the context of AMR which uses such recursive codes, the unique aspects of the invention apply equally to other systems which use non-recursive convolutional codes. Other decoding techniques are possible but this description presumes usage of the Viterbi algorithm The Viterbi algorithm is usually described using a trellis. Each column in the trellis is referred to as a stage whereas each node within a given column is referred to as a state. The first stage of the trellis has a single state. The number of states in each subsequent stage doubles up until the size reaches 2 to the power of the (constraint length−1) where the constraint length is defined as the number of positions in the channel encoder shift register. The number of states stays constant until near the end of the trellis. Typically, the shift register in the convolutional encoder is flushed with zeroes once all of the valid data bits have been encoded. This is represented in the trellis by its contracting from its steady-state size back down to a single state where the number of states is halved at each stage, i.e. the end of the trellis looks like the mirror image of the start of the trellis. For a rate 1/n code, a given state in the trellis initially leads to 2 states in the next stage meaning each state in the next stage has two input paths. For each state in the next stage, only the transition leading to the best metric at that state is retained, i.e. one of the 2 transitions gets pruned.

In tracing through the trellis using the Viterbi algorithm, a metric is calculated for each state within a given stage. This metric, henceforth referred to as a Viterbi metric, indicates the confidence level that the transmitted data corresponds to that of the trellis path leading to that state. In practice, the metric need not be maintained for every node in the trellis; it is only necessary to maintain a metric for the maximum number of states at a given stage. Such metrics may be normalized at each stage when transitioning through the trellis but for purposes of this embodiment the metrics should be accumulated without normalization. The best metric at a given stage represents the most likely path up to that point.

Figure 10:
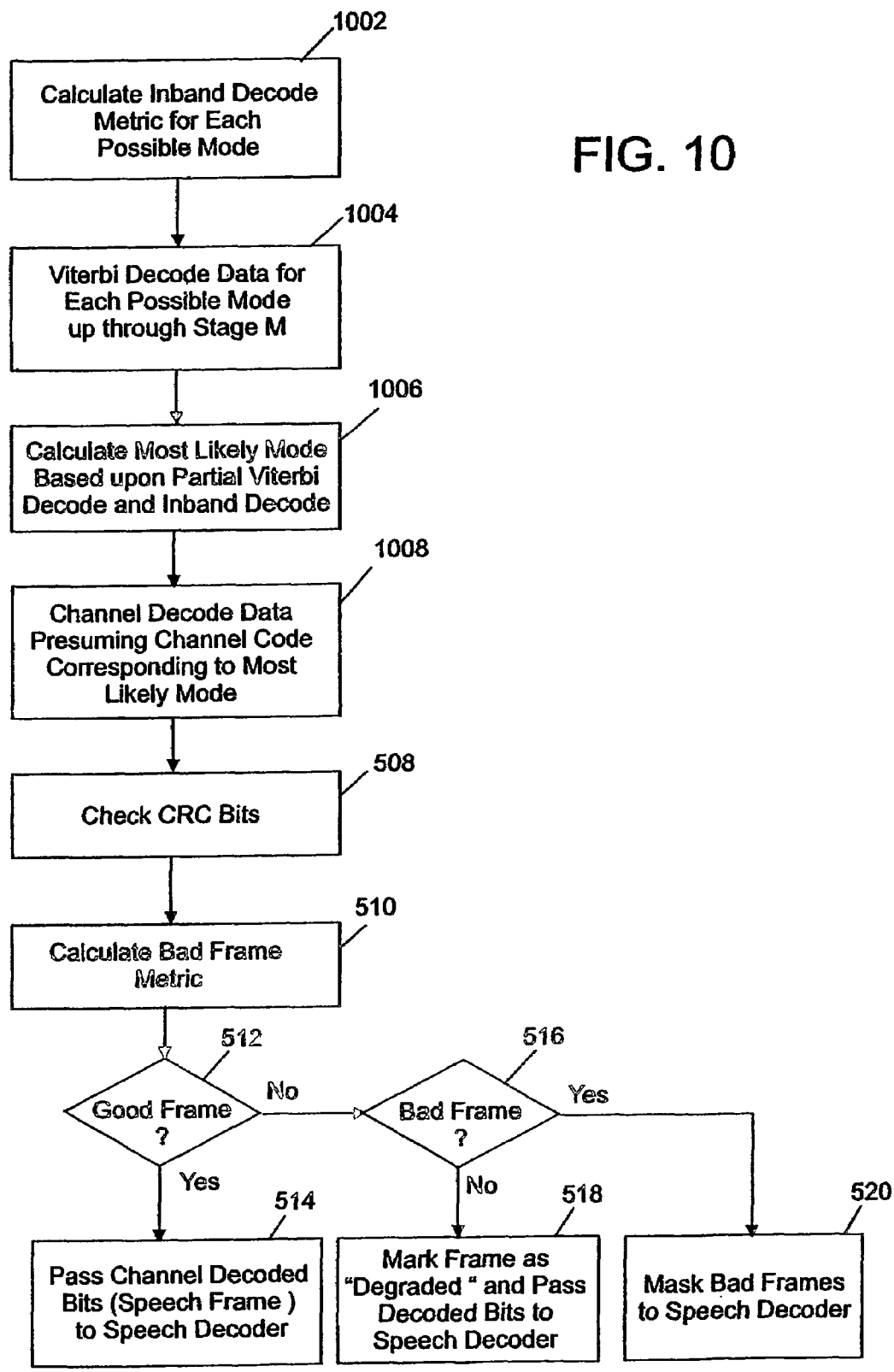
FIG. 10 is a flow chart illustrating still another alternative process for channel decoding an AMR speech frame according to the present invention.

The alternate embodiment is described in the flowchart of FIG. 10. In this method, the inband data is analyzed and a metric is calculated 1002 for each possible mode, e.g. the Euclidean distance is measured to determine a confidence level for each mode. A Viterbi decode is performed 1004 for each possible channel coding (mode) only up through a certain stage. The number of stages traversed should be large enough to achieve some confidence that the Viterbi metric at that stage is representative but not so large that the computational advantage of the method is lost. The number of stages should be at least equal to the number stages required to reach the steady-state for each code, i.e. the constraint length−1 of the code with the largest constraint length. A value of 2-3 times said constraint length is recommended, e.g. 20 stages might be traversed.

At this point, the best metric is found for each channel decode attempt 1006. This is mapped to a confidence level which is combined with the inband decode results to determine the most likely channel mode 1008. The Viterbi decode corresponding to that mode is then restarted from the point at which it prematurely stopped. The resulting decoded frame is classified and speech decoded in the normal manner.

A slight variation on this method involves ordering the inband decode metrics and performing the partial Viterbi decodes in the order indicated as most likely by the inband decoder. If the best Viterbi metric for the most likely mode is above some threshold, the channel decode continues and that mode is definitively used. Otherwise, a partial Viterbi decode is performed assuming the next most likely mode. If the best Viterbi metric for that decode is above some threshold, the channel decode continues for that mode. This process repeats until a best partial Viterbi metric is found which is above the threshold or the possible modes have been exhausted. If the decodings are exhausted, the one with the best metric is pursued.

It is to be recognized by one skilled in the art that various combinations of the methods described above may also be used along with derivatives that are not explicitly discussed. The methods could be implemented in software (DSP or general-purpose microprocessor), hardware, or a combination.

It should also be noted that the term "receiver" as used herein refers to the receiving portion of a cellular transceiving device. A cellular transceiving device includes both a mobile terminal (MS) as well as a base station (BSS). A mobile terminal must be in communication with a base station in order to place or receive a call. There are numerous protocols, standards, and speech codecs that can be used for wireless communication between a mobile terminal and a base station.

While the present invention is described herein in the context of a mobile station, the term "mobile station" may include a cellular radiotelephone with or without a multi-line display; a Personal Communications System (PCS) terminal that may combine a cellular telephone with data processing, facsimile and data communications capabilities; a Personal Digital Assistant (PDA) that can include a radiotelephone, pager, Internet/intranet access, Web browser, organizer, calendar and/or a global positioning system (GPS) receiver; and a conventional laptop and/or palmtop receiver or other computer system that includes a display for GUI. Mobile stations may also be referred to as "pervasive computing" devices.

Specific embodiments of the present invention are disclosed herein One of ordinary skill in the art will readily recognize that the invention may have other applications in other environments. In fact, many embodiments and implementations are possible. The following claims are in no way intended to limit the scope of the present invention to the specific embodiments described above. In addition, any recitation of "means for" is intended to evoke a means-plus-function reading of an element and a claim, whereas, any elements that do not specifically use the recitation "means for" are not intended to be read as means-plus-function elements, even if the claim otherwise includes the word "means".

The invention claimed is:

1. A method of channel decoding speech frames in a receiver capable of multiple (M) codec modes, said channel encoded speech frames comprised of an inband bit portion and a speech portion, said method comprising:
    calculating, by an inband bit decoder of the receiver, a plurality of inband decode metrics, one for each speech codec mode before a decoding error has been detected;
    ordering, by the inband bit decoder, the inband decode metrics from highest to lowest representing a most likely codec mode to a least likely codec mode, respectively, before a decoding error has been detected, based upon a Euclidian distance measure;
    partially decoding, by a channel decoder of the receiver, speech data for each speech codec mode;
    determining, by the channel decoder, the most likely speech codec mode based upon the partially decoded speech data and the calculated inband decode metric data; and
    resuming, by the channel decoder, decoding of the speech data using the most likely speech codec mode, the resumed decoding comprising a recursive convolutional decode.

2. A receiver for channel decoding speech frames, said receiver capable of multiple (M) codec modes, said channel encoded speech frames comprised of an inband bit portion and a speech portion, said receiver comprising:
    an inband bit decoder, the inband bit decoder:
        decoding the inband bit portion of a speech frame to obtain confidence levels associated with each of the M codec modes before a decoding error has been detected;
        ordering the confidence levels from highest to lowest representing a most likely codec mode to a least likely codec mode, respectively, before a decoding error has been detected, based upon a Euclidian distance measure; and
        choosing the most likely speech codec mode based on the highest confidence level to decode the speech portion; and
    a channel decoder coupled with the inband bit decoder for:
        decoding the speech portion of the received frame using the chosen codec mode, the decoding comprising a recursive convolutional decode;
        performing a frame determination check to determine the quality of the decoded speech frame; and
        if the decoded speech frame is determined to be of poor quality, then choosing the next most likely codec mode corresponding to the next highest inband bit decoding confidence level of the confidence levels ordered before a decoding error has been detected and running the channel decoder on the received frame again.

3. The receiver of claim 2 wherein the channel decoder is run for a maximum number of iterations (N), where N≦M.

4. The receiver of claim 3 wherein the maximum number of iterations N is determined prior to the inband bit decoder choosing the most likely codec mode to decode the speech portion based on the highest confidence level.

5. The receiver of claim 4 wherein the maximum number of iterations (N) is set to the number of codec modes that exceed a threshold confidence level.

6. The receiver of claim 2 wherein the channel decoder is run so long as the confidence level for the inband bit decoding with respect to the current codec mode is above a threshold confidence level.

7. A receiver for channel decoding speech frames, said receiver capable of multiple (M) codec modes, said channel encoded speech frames comprised of an inband bit portion and a speech portion, said receiver comprising:
    an inband bit decoder, the inband bit decoder:
        calculating a plurality of inband decode metrics, one for each codec mode before a decoding error has been detected;
        ordering the inband decode metrics from highest to lowest representing a most likely codec mode to a least likely codec mode, respectively, before a decoding error has been detected, based upon a Euclidian distance measure;
    a channel decoder for:
        partially decoding speech data for each codec mode;
        determining the most likely codec mode based upon the partially decoded speech data and the calculated inband decode metric data; and
        resuming decoding of the speech data using the most likely codec mode, the decoding comprising a recursive convolutional decode.

* * * * *